(No Model.)
O. S. OSBORN.
LANDAU CARRIAGE TOP LOCK.
No. 290,349.  Patented Dec. 18, 1883.
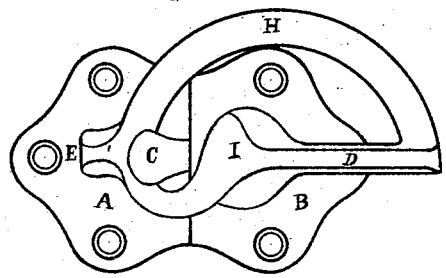
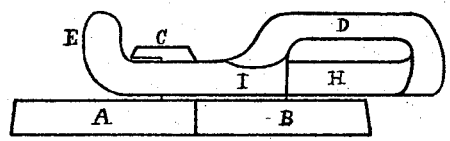
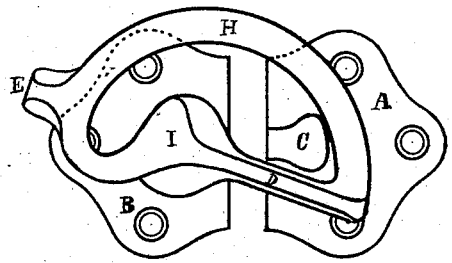
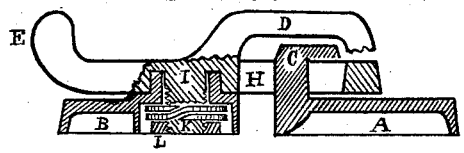
Witnesses
Chas S. Marsh
Henry R. Youngs
Inventor
Oliver S. Osborn
Willis G. Judson

UNITED STATES PATENT OFFICE.

OLIVER S. OSBORN, OF NEW HAVEN, CONNECTICUT.

LANDAU-CARRIAGE-TOP LOCK.

SPECIFICATION forming part of Letters Patent No. 290,349, dated December 18, 1883.

Application filed June 11, 1883. (No model.)

*To all whom it may concern:*

Be it known that I, OLIVER S. OSBORN, of New Haven, in the county of New Haven and State of Connecticut, have invented a new Improvement in Landau-Carriage-Top Locks; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, an edge view. Fig. 3 illustrates the operation, and Fig. 4 a longitudinal central section.

This invention relates to an improvement in the hooks or fastenings by means of which the parts of the top of a Landau and other carriages are secured together when closed. The device usually employed for this purpose is either a simple hook, necessitating that the parts be drawn close together before the hook could be secured, or a combination of two hooks in such a manner that one will reach when the parts are not in direct opposition and the other will draw the parts together.

The object of this invention is the construction of a device which, secured to one part, will engage the connection on the other part before the parts have been completely brought together, and at the same time draw them together without having recourse to a second hook.

The invention consists in a hook attached by means of a pivot to one part and a corresponding connection for said hook on the other part. When the hook has been engaged by revolving on its pivot through two right angles, the two parts may be drawn close together.

B is the plate which forms the connection of the hook to one part; A, the plate upon the other part carrying the device to which the hook is secured—that device here represented as a stud, C.

D is the strengthening-bar of the hook, and is elevated so as to clear the stud C in the manipulation of the hook.

H is a semicircular bar, forming the essential part of the hook and passing around the stud C with its center at I. The hook H E I D is secured at the pivot I to the plate B by a spring-washer, K, and a nut, L; hence there is no rattling, and the hook can be revolved through an entire circle. When the hook H E I D is revolved to the position seen in Fig. 3, the bar D will pass just above the stud C, and the part H will become engaged in the stud C at its angle of junction with the bar D. As the revolution is continued, the plate A, and with it the part of the Landau top to which it is attached, is drawn closer and closer to the plate B till the plates are in opposition, as seen in Fig. 1.

The amount of draw is shown by the varying distance from I to H.

I claim as my invention—

The semicircular bar H, pivoted out of the center and provided with strengthening-bar D, attached to one part of the carriage-top, and a securing device, C, upon the other, the revolution of said bar H around its pivot causing the two points of attachment to approach each other, substantially as set forth.

OLIVER S. OSBORN.

Witnesses:
CHAS. S. MARSH,
HENRY R. YOUNGS.